MAGNETIC DISC RECORDER

Filed March 1, 1954 2 Sheets-Sheet 1

INVENTORS.
WILLIAM A. FARRAND
SPENCER G. JOHNSTON
BY LESTER L. KILPATRICK
JOHN P. LEKAS
William R Lane
ATTORNEY INVENTORS.
WILLIAM A. FARRAND
SPENCER G. JOHNSTON
LESTER L. KILPATRICK
JOHN P. LEKAS
BY William R Lane
ATTORNEY

United States Patent Office 2,899,260

Patented Aug. 11, 1959

2,899,260

MAGNETIC DISC RECORDER

William A. Farrand, Downey, Spencer G. Johnston, Los Angeles, Lester L. Kilpatrick, Downey, and John P. Lekas, Hollywood, Calif., assignors to North American Aviation, Inc.

Application March 1, 1954, Serial No. 413,315

17 Claims. (Cl. 346—74)

This invention relates to a magnetic disc recorder for recording and reproducing electrical signals. Such a recorder provides a storage element for computers. It may also be used in those instances requiring a data delay interval or quick access to time-distributed information.

Up to the present time, considerable difficulty has been experienced in obtaining satisfactory storage devices. Among the problems involved in magnetic recorders are those of small tolerances, providing recording and reading heads having a flat frequency response, and obtaining suitable space relationship between the heads and the magnetic disc and maintaining them in this spaced relationship. Among the advantages obtained by this invention are wide frequency response (above 10 megacycles) improved signal-to-noise ratio in recording and reading, smaller channel width in physical size, isolation between channels to prevent cross-talk, and relative ease of construction. Small dimensional tolerances are relatively few, and precision construction is not necessary in this device.

A rotating magnetic recorder precesses under angular velocities much the same as a gyro. Conventional bearings become unevenly loaded under these circumstances and uneven deflection occurs, interfering with the uniformly spaced relationship between the heads and the rotating disc. If the device is carried in an aircraft, acceleration may cause uneven bearing deflection. A boundary lubricated air bearing, or viscous shear air bearing, as used herein, permits a minimum of deflection and acts to maintain evenly spaced relationship between the heads and the disc.

Over cylindrical recorders, the disc type recorder is advantageous in that expansion of the disc does not act to reduce the recording gap.

It is therefore an object of this invention to provide an improved magnetic disc recorder.

A further object of this invention is to provide a disc recorder utilizing an air bearing against the magnetic disc.

Another object of this invention is to provide a recorder relatively insensitive to bearing loads.

Another object of this invention is to provide a disc recorder that is economical in construction and requires a minimum of precision construction.

Other objects of invention will become apparent from the following description taken in connection with the accompanying drawings, in which Fig. 1 is a cross section of a recorder showing two magnetic discs;

Figures 3, 7, 8:
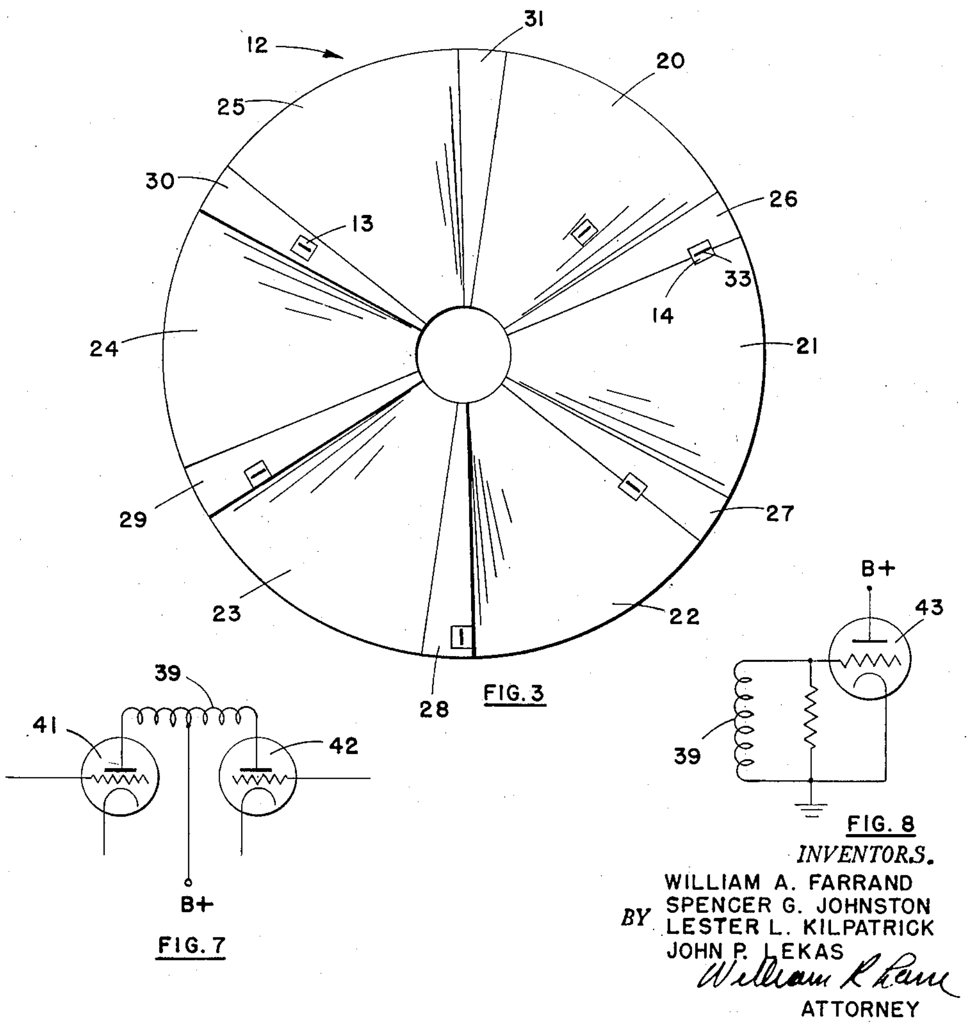
Fig. 3 is a view of the head plate from the underside, line 3—3, Fig. 2.

And Figs. 7 and 8 indicate typical head connections to an amplifier.

Figures 1, 4, 5, 6:
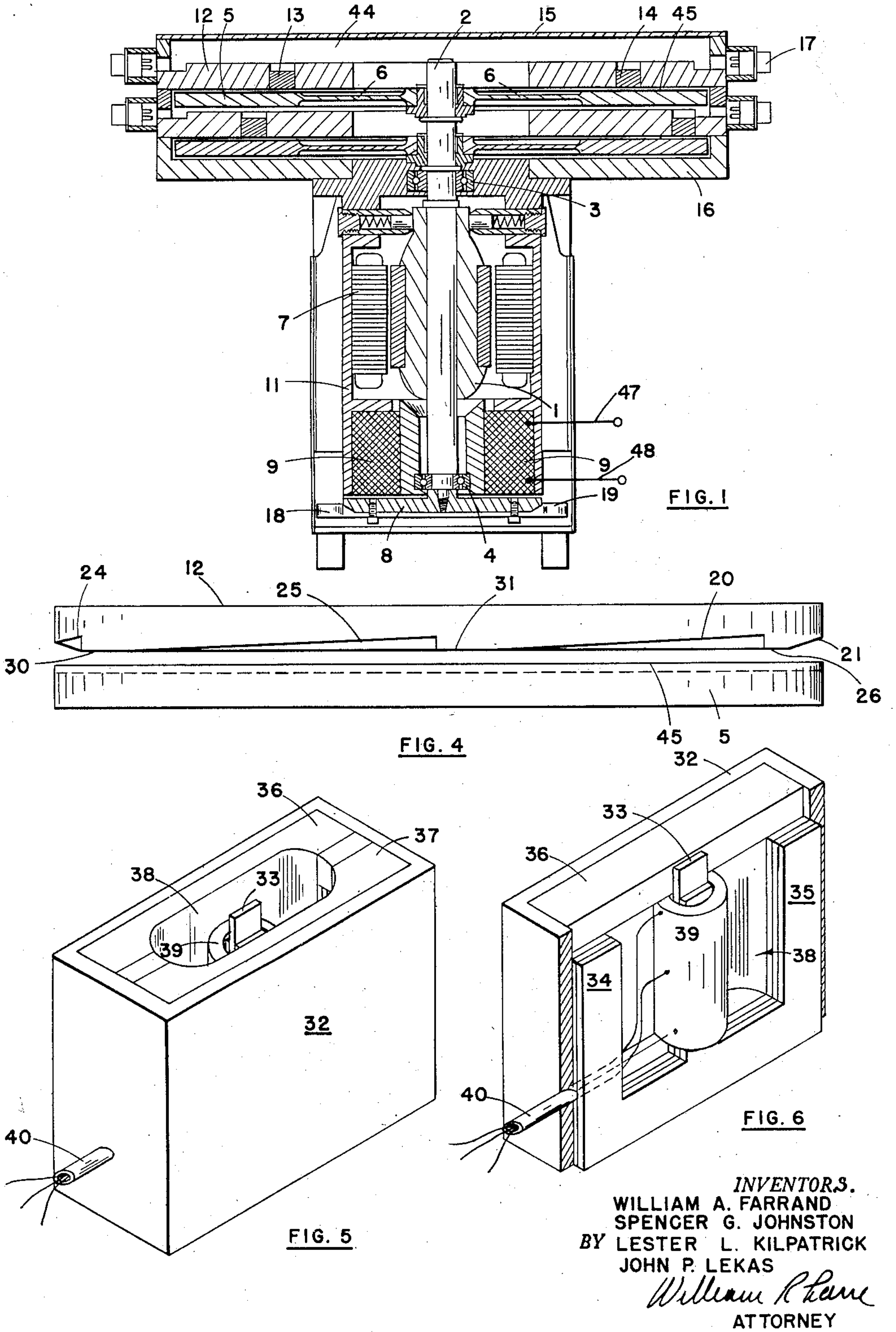
Fig. 4 is a side view of the head plate and magnetic disc.
Fig. 5 is an enlarged perspective view of a magnetic write head.
Fig. 6 is a partial cross section of a read head which is similar to that in Fig. 5.

Referring to Fig. 1, which is a cross section, a commutated rotor 1 is located upon shaft 2 and held in position by bearing 3 and thrust bearing 4. At one end of shaft 2 are ferromagnetic discs such as disc 5 which has a retentive magnetic material 45 cast in an annular ring on its upper surface. Each disc is necked down to form a flexible web 6 between the hub and the outer annular portion of the disc. A stator 7 and rotor 1 provide a motor to rotate circular disc 5. At the bottom end of shaft 2 is a steel disc 8. Disposed near disc 8 is solenoid 9 attached to the frame 11 to which bearings 3 and 4 and stator 7 are also attached. Record or read heads 13 and 14 are located on the lower face at various positions in head plate 12. It is desired upon rotation, that disc 5 assume a position in close proximity to head plate 12 and recording heads 13 and 14. The gap between them is on the order of 0.0001 of an inch. A boundary lubricated bearing between disc 5 and head plate 12 is developed to acquire a proximity of this order.

A viscous shear or boundary lubricated air bearing can be produced by a flat plate spinning in close proximity (about 0.001 of an inch) to a second plate which is relieved to form slanted or stepped depressions. The depressions are situated so that the spinning plate causes a piling up and shearing of air at the shoulders of the depressions or troughs in the other plate. This viscous shear or boundary lubricated air bearing is self-lubricated with air and is not to be confused with those bearings utilizing air under pressure or air turbulence, the pumping of air, or centrifugal pumping of fluids which are often used to provide bearing lubrication. The prior art requires increased air or fluid pressure to be applied between thrust surfaces by some impeller or pump structure. Applicants require no such impeller or pump and utilizes a thin film of air as a lubricant. Therefore, as may be expected, the device of the invention works satisfactorily in rarified atmosphere. Initially, while the motor is being brought up to speed, solenoid 9 is not energized and the weight of disc 5, rotor 1, shaft 2 and disc 8 holds the shaft at its lowest thrust position allowed by bearing 4. As the motor reaches a speed suitable for developing a boundary lubricated air bearing, solenoid 9 is energized by current received through terminal wires 47 and 48 and plate 8 is attracted upwardly. Such solenoid may be energized by a hand-thrown switch or by automatic means. Such structure for energization may be any of the several commonly known methods of energizing electrical circuits. Shaft 2 and disc 5, likewise, move upwardly within limits allowed by bearings 3 and 4 until the thrust bearing 4 is preloaded by shaft 2. The amplitude of upward allowed by thrust bearing 4 is such that a boundary lubricated air bearing is developed between the face of disc 5 and the face of head plate 12. The force developed by the solenoid is thus counteracted by both the air bearing and the thrust bearing 4. The necked down portion or web 6 of disc 5 becomes loaded as a spring and the disc is held in close spaced relationship with the head plate. Due to the quality of the air bearing, misalignment between shaft 2 and head plate 12 will cause web 6 to flex in each rotation and maintain the disc 5 parallel to the head plate. Cold rolled SAE 1137 steel is suitable for disc 5. In a disc 10 inches in diameter, the necked down spring portion, web 6, can be of the order of .025 inch thick and the hub and annular portion of the order of ¼ inch thick.

A cover plate 15 and base plate 16 provide an enclosure for the discs. Electrical plugs such as 17 provide for electrical connection to the heads through the enclosed portion.

Attached to steel disc 8 is a fan having impellers 18 and 19 for circulating air to cool the motor.

A particular feature of this device is that it is insensitive to loading due to acceleration (e.g., as might be experienced if carried in an aircraft) providing the preload on thrust bearing 4 is never exceeded.

Figure 2:
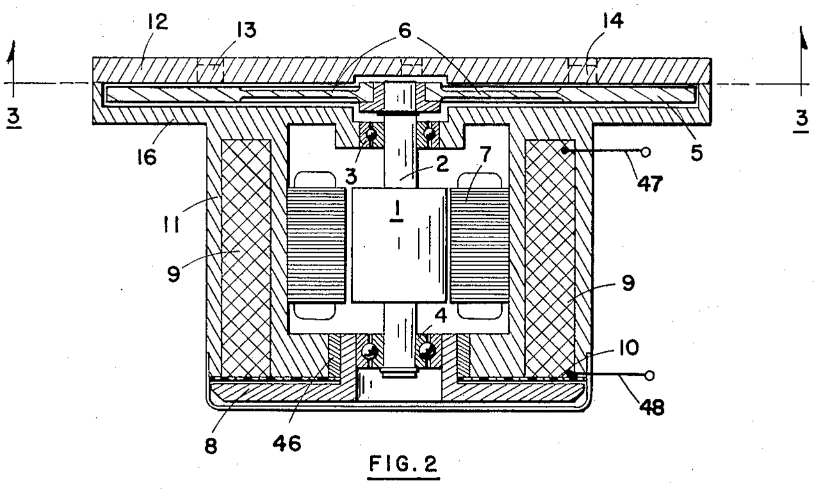
Fig. 2 is a cross section of the device, in modified form, showing one magnetic disc.

Fig. 2 is a simplified sketch of the device, showing a single disc and a steel disc 8 which does not rotate. Solenoid 9 attracts the disc upwardly but a layer of insulation 10 limits the upward movement. The thrust developed by disc 8 is transmitted through thrust bearing 4 to shaft 2. An Oilite sleeve 46 allows free sliding of disc 8.

Fig. 3 is a view of head plate 12 looking from the underside, taken at line 3—3, Fig. 2. Depressions are cut into the underside of head plate 12. These depressions are numbered 20, 21, 22, 23, 24 and 25. There are a number of lands 26, 27, 28, 29, 30 and 31, which remain unchanged and are not relieved as are the areas which form depressions. It is not necessary that the reading and recording heads be physically adjustable relative to the head plate after initial mounting. The heads can be inserted into milled holes in the head plate and a plastic binder used to hold the head rigidly in the head plate. The lower surface of the head plate is lapped until the surface of all heads are in a single plane. This plane is the plane of the lands. Further lapping increases the width of the lands, if desired. A master glass plate, accurately scribed, can be used in conjunction with a microscope to accurately align the pole piece of each head, as desired, circumferentially and radially in head plate 12 before the plastic binder sets.

Fig. 4 is a side view of the magnetic disc 5 and head plate 12. This figure portrays the wedge-shaped depression 20 as a smooth slope from land 31. In this figure, the depressions are exaggerated for clarity. The depth of each depression is approximately 0.001 inch, ±0.0002 inch. A desirable ratio of the width of land 31 to the width of wedge 20 has been determined to be about 4 to 1 which is not critical. As disc 5 and magnetic material 45 spin past head plate 12, an air bearing is formed between the discs at lands 26, 27, 28, 29, 30 and 31. If the magnetic disc is flat and the head plate is constructed as shown, rotating one disc relative to the other will develop a boundary lubricated air bearing between the disc and its head plate due to the viscous shear of air. The construction shown is preferable, but an air bearing can be developed without land surfaces or by forming the depressions in steps rather than by smooth slopes.

As indicated in Fig. 3, the various heads, such as 13 and 14, may be located indiscriminately around the face of head plate 12. It is desired that the heads be aligned so they are all at a uniform distance from magnetic material 45, Fig. 4. Utilizing an air bearing in this fashion, permits magnetic material 45 to come considerably closer to the recording heads than has heretofore been achieved. This is an advantage in that new types of recording heads may be used, in addition to previous types which are unsatisfactory unless close spacing is acquired.

A magnetic write head which has been developed for use in this device is that indicated in Fig. 5. To prevent reradiation, the entire head is encased in a shield 32 of electroplated layers of nickel, copper, nickel, and copper. Fig. 6 shows a read head of similar construction. Both heads include a pole piece 33 as indicated in Fig. 6 constructed of three laminations, each 0.001 inch thick. The pole piece should be of high permeability material. This is commonly nickel and iron, or nickel, iron, and cobalt alloy, such as Supermalloy. The opposite limbs 34 and 35 of the pole piece are held between sections 36 and 37 of ferrite material having a hollow center portion 38 through which the center limb of pole piece 33 extends. A ferrite and ceramic material having high initial permeability and high bulk resistivity is satisfactory for the construction of sections 36 and 37. A coil of wire 39 is wound around the center limb of pole piece 33 and has a center tap and a tap at each end. A shield 40 is provided for the connections to coil 39. Into the hollow portion 38 in the ferrite sections 36 and 37 is deposited a plastic dielectric mixed with a filler, such as an epoxy resin mixed with glass beads. This material provides rigidity and matches its expansion to the expansion of the surrounding materials with applied heat. It is noted that the center lamination of the pole piece 33 extends above coil 39 while the remaining two laminations terminate approximately flush with the uppermost end of coil 39. Also, the limbs 34 and 35 terminate below the face of ferrite sections 36 and 37. In this manner, the return magnetic path is the whole face of sections 36 and 37. The heads of Figs. 5 and 6 differ in the spacing at the face of the head between the ferrite sections and the pole piece 33. In Fig. 6, the read head, this spacing is about 0.002 of an inch.

Fig. 7 indicates how the three connections to the write head would be utilized in recording upon the magnetic disc, the center tap of coil 39 being connected to the B+ supply and each end of the winding being connected to the plate of respective driver tubes 41 and 42. A phantom center tap can be substituted in this instance for an actual center tap.

Fig. 8 indicates how the head in Fig. 6 is utilized as a reading head. The center tap is unused and one end of the coil is connected to ground. The other end is connected to the grid of a detector tube 43.

Fig. 3 indicates the relative alignment of pole piece 33 of head 14 in the head plate 12.

In the space 44, Fig. 1, a vapor phase inhibitor may be included in a small bag to inhibit the oxidation of various parts.

For best results, the magnetic layer 45 on the upper surface of disc 5 should be of uniform thickness. Red iron oxide in a plastic binder at about .001 inch thickness to a uniformity of .00005 of an inch is a practicable material and can be obtained by casting the magnetic material on the disc and then lapping it.

If more recording channels are desired, innumerable discs and head plates may be added, providing due consideration is given to the design of the motor, bearings and solenoids.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a magnetic recorder, a first disc having a plurality of troughs disposed in and distributed over a major portion of one face of said disc, a second disc having a magnetizable medium on one face and adapted to assume a position in close proximity to said first disc, at least one magnetic head disposed in said first disc, and means for rotating one of said discs relative to the other at a predetermined speed to develop a self-lubricated viscous shear gas bearing between said discs over a major portion of said one disc.

2. The combination recited in claim 1 wherein said troughs are uniformly spaced apart so as to form lands therebetween.

3. In a magnetic recorder, a first disc having a plurality of wedge-shaped depressions disposed in circular fashion in one face of said disc, a second disc having a magnetizable medium on one face and adapted to assume a position in which the magnetizable face is in close proximity with said face of said first disc, at least one magnetic head disposed in said first disc, and means for rotating one of said disc relative to the other at a predetermined speed to develop a self-lubricated viscous shear gas bearing between said discs.

4. In a magnetic recorder, a first disc having radially directed depressions formed in one face thereof, one or more magnetic heads disposed in said disc, a second disc having a magnetizable medium on one face and adapted to assume a position in which the magnetizable face of said second disc is in close proximity with said face of said first disc, shaft means for rotating one of said discs relative to the other at a predetermined speed to develop a self-lubricated viscous shear gas bearing between said discs, and resilient means for connecting said shaft means to the driven disc.

5. In a magnetic recorder a first disc having trough-shaped depressions formed radially on one face thereof, one or more magnetic heads disposed in said disc, a second disc having a magnetizable medium on one face and adapted to assume a position in which the magnetizable face is in close proximity with said face of said first disc, shaft means for rotating said second disc relative to said first disc to develop a self-lubricated viscous shear gas bearing between said discs, and resilient means mounting said shaft means to said second disc.

6. In a magnetic recorder, a first disc having trough-shaped depressions formed in one face thereof, said depressions being uniformly spaced apart said depressions having a maximum depth not greater than on the order of one-one thousandths of an inch, at least one magnetic head disposed in said disc, a second disc having a magnetizable medium on one face and adapted to assume a position in which the magnetizable face of said second disc is contiguous to said face of said first disc, and shaft means for rotating said second disc relative to said first disc to develop a self-lubricated viscous shear gas bearing between said discs, said second disc having a resilient portion between said magnetizable face and said shaft means.

7. In a magnetic recorder, a first disc having depressions formed in one face thereof, said depressions having a maximum depth not greater than on the order of one-one thousandths of an inch, said depressions being spaced apart at a distance approximately one-fourth the width of each depression at least one magnetic head disposed in said face of said disc, a second disc having a magnetizable medium on one face, said second disc adapted to move from a remote position to a position in which the magnetizable face is contiguous to said face of said first disc, shaft means for rotating said second disc, said second disc having a resilient hub portion, means for rotating said shaft means to develop a self-lubricated viscous shear gas bearing between said discs, and means forcing said second disc toward said first disc while said second disc is being rotated whereby a boundary lubricated air bearing is developed between said discs.

8. In a magnetic recorder, a first disc having wedge-shaped depressions radially formed in one face thereof, said depressions being uniformly spaced apart, magnetic head means disposed in said disc, a second disc having a magnetizable medium on one face, said second disc adapted to move from a remote position to a position in which the magnetizable face is contiguous to said face of said first disc, shaft means for rotating said second disc, said second disc having a resilient hub portion, means for rotating said shaft means to develop a self-lubricated viscous shear gas bearing between said discs, means thrusting said second disc and said shaft means toward said first disc while said second disc is being rotated, and thrust bearing means on said shaft means adapted to absorb part of said thrust whereby the boundary lubricated air bearing developed between said discs absorbs the remainder of said thrust.

9. In a magnetic recorder, a first disc having wedge-shaped depressions radially formed in one face thereof, said depressions being uniformly spaced apart, magnetic head means disposed in said disc, a second disc having a magnetizable medium annularly disposed on one face, said second disc adapted to move from a remote position to a position in which the magnetizable face is contiguous to said face of said first disc, shaft means for rotating said second disc, said second disc having a resilient hub portion, means for rotating said shaft means to develop a self-lubricated viscous shear air bearing between said discs, electromagnet means for thrusting said second disc toward said first disc while said second disc is being rotated, and thrust bearing means disposed so so that thrust of said electromagnet is counteracted by said thrust bearing and the air bearing developed between said discs.

10. In a magnetic recorder, a first disc having wedge-shaped depressions radially formed in one face thereof, magnetic head means disposed in said face of said disc, said depressions being uniformly spaced apart, said depressions having a maximum depth not greater than on the order of one-one thousandths of an inch and said depressions being spaced apart on the order of one-fourth the width of each depression a second disc having a magnetizable medium on one face, said second disc having a resilient hub, shaft means connected to the hub of said second disc, and thrust bearing means on said shaft, said second disc adapted to move from a remote position to a position in which its magnetizable face is contiguous to said face of said first disc at a predetermined thrust loading of said thrust bearings and means for rotating said shaft means to develop a self-lubricated viscous shear gas bearing between said discs.

11. In a magnetic disc recorder, a first disc having magnetic heads and a second disc having a magnetic medium, one of said discs being adapted to be rotated on the order of one-ten thousandths of an inch from said first disc, means for relatively rotating said discs means for creating a self-lubricated, viscous shear gas bearing between said discs in response to said relative rotation whereby the magnetic heads of one of said discs are moved in spaced relationship with respect to said magnetic medium.

12. The combination recited in claim 11 wherein is included means for placing a thrust load upon one of said discs in a direction toward the other of said discs.

13. In a magnetic disc recorder, a first disc having magnetic heads, a second disc having a magnetic medium, one of said discs adapted to rotate and assume an operative position in close proximity to the other of said discs, a plurality of troughs formed in one of said discs, means for relatively rotating said discs to develop a self-lubricated viscous shear gas bearing between said discs, and means for applying a force to said discs so as to load said thrust bearing.

14. In a magnetic recorder, a first disc having at least one magnetic head, a second disc having a magnetic medium thereon, means for rotating one of said discs relative to the other, means for moving one of said discs, while rotating, into a position proximate to the other of said discs, means for forming a self-lubricated viscous shear, thrust air bearing between said discs.

15. The combination recited in claim 9 wherein said wedge-shaped depressions having a maximum depth not greater than on the order of one-one thousandths of an inch.

16. The combination recited in claim 9 wherein said depressions are spaced apart in the order of one-fourth the width of said depressions.

17. In a magnetic recorder, two relatively rotatable discs, one of said discs having a plurality of symmetrically spaced wedge-shaped depressions radially formed on one face thereof, a magnetic medium on one face of the other of said discs in close proximity to said one face of said one disc, a magnetic head on said one disc positioned to cooperate with said magnetic medium, and means for effecting relative rotation of said discs to develop a self-lubricated, gas viscous shear bearing therebetween.

(References on following page)

References Cited in the file of this patent

UNITED STATES PATENTS

| | | |
|---|---|---|
| 1,876,515 | Emmet | Sept. 6, 1932 |
| 2,144,844 | Hickman | Jan. 24, 1939 |
| 2,362,667 | Schmidt | Nov. 14, 1944 |
| 2,603,539 | Brewster | July 15, 1952 |
| 2,671,700 | Seyffert | Mar. 9, 1954 |
| 2,750,579 | Lekas et al. | June 12, 1956 |

FOREIGN PATENTS

| | | |
|---|---|---|
| 279,847 | Great Britain | Jan. 26, 1928 |